Nov. 3, 1931.   F. L. MORSE   1,830,206
POWER TRANSMISSION CHAIN
Filed Feb. 1, 1928   5 Sheets-Sheet 1

Fig. 1.

INVENTOR
Frank L. Morse
BY
Synnestvedt & Lechner
ATTORNEYS

Nov. 3, 1931.  F. L. MORSE  1,830,206
POWER TRANSMISSION CHAIN
Filed Feb. 1, 1928   5 Sheets-Sheet 3

INVENTOR
Frank L. Morse
BY
Synnestvedt & Lechner
ATTORNEYS

Patented Nov. 3, 1931

1,830,206

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

POWER TRANSMISSION CHAIN

Application filed February 1, 1928. Serial No. 250,987.

This invention relates to chains used in the transmission of power, especially chains of the so-called silent type which are run at relatively high speeds. Chains of any type when running on rapidly rotating sprockets may develop noise and vibration at certain speeds while running quite smoothly at other speeds. Periodic shocks or changes in velocity or direction as the chain meets the sprocket may create effects under high speed conditions which are highly objectionable in certain classes of service. To meet such service in an effective manner, many factors must be considered, and it is especially desirable to eliminate or offset all factors that tend to introduce vibrations or periodic shocks, however slight.

The ordinary chain, in running on a sprocket, does not meet it exactly tangentially, but engages a sprocket tooth somewhat before the point of tangency, and is then carried slightly upward and over the top of the sprocket before it settles into final engagement and is carried down around the sprocket. While the up and down motion thus transmitted to the free chain is very slight, yet it is periodic in character, occurring with each tooth, and may build up objectionable vibrations. It is, therefore, desirable, both theoretically and practically, to make a chain which will travel more truly on a straight line during the process of engagement with a sprocket tooth; so that whatever the motions given the parts in contact with the sprocket wheel, the free portions of the chain will receive merely a straight line pull.

The purpose of the present invention is to improve drive chains along these lines, particularly by providing means for shifting the center of articulation in a definite and positive manner during the engaging period so as to lead the chain more smoothly on and off the wheel.

Another object resides in the provision of a chain drive in which acceleration of the chain during initial engagement with the sprocket over the normal speed of the chain is substantially eliminated.

Still another object is to control the action of the bearing and wearing surfaces so as to regulate wear.

A further object is to control the kinematic action of a running chain, and various other objects will become apparent as the description proceeds.

In other applications I have shown, in various forms, chains having transverse motion of the center of articulation, in which the joint more or less freely seeks new positions under the tensions and turning forces applied. In the present invention I now arbitrarily modify and control these shifting joint actions,—often in the middle of or contrary to the natural action of the joint under tension; and for this purpose employ cam surfaces, stops, and/or interferences between any of the various moving parts to effect the control desired.

I am aware that shifting joints have been made which had merely the effect of lengthening or shortening the effective length of the link or chain, without materially correcting the action of the chain up and down, i. e., the motion of the chain transverse to the line of pull. Such joints do not accomplish the purpose of this invention, which is distinguished from them by having the joint action controlled or limited transversely of the line of pull so as to produce a compensating action to smooth out the vertical movement or lift of the chain, instead of merely shortening or lengthening the chain longitudinally.

How the foregoing, together with such other objects and advantages as may be incident to my invention, are obtained is illustrated in the accompanying drawings, wherein—

Figs. 2, 3 and 4 are enlarged detail views of the chain shown in Fig. 1, illustrating different phases of the joint action. In the foregoing figures the sides of the pintle holes are used as camming or controlling surfaces.

Fig. 8 shows a joint controlled by cam surfaces outside of the pintle holes.

Figs. 9 and 10 are enlarged details of Fig. 8.

Fig. 11 illustrates a pin and bushing type of joint controlled by cams.

These are only a few of the various forms in which the invention may be applied, but will serve to make clear the principles thereof, and the various possible applications to different chains will then be apparent to those skilled in the art.

In the form shown in Figs. 1, 2, 3 and 4, a three part pintle is illustrated having certain clearances and relations to the sides of the pintle holes so as to control the shifting of the center of articulation inward during part of its action and outward during another part of its action, so as to offset the opposite action which is normally created by sprocket teeth engaging a chain, and provide a compensating joint.

By "inward" or "downward" as used in this specification, I mean in a general direction toward the line connecting the centers of the sprocket wheels of a chain drive, and by "outward" or "upward" I mean an opposite direction, or a direction to carry the chain or parts thereof further from the line of centers of the drive.

Figure 1:
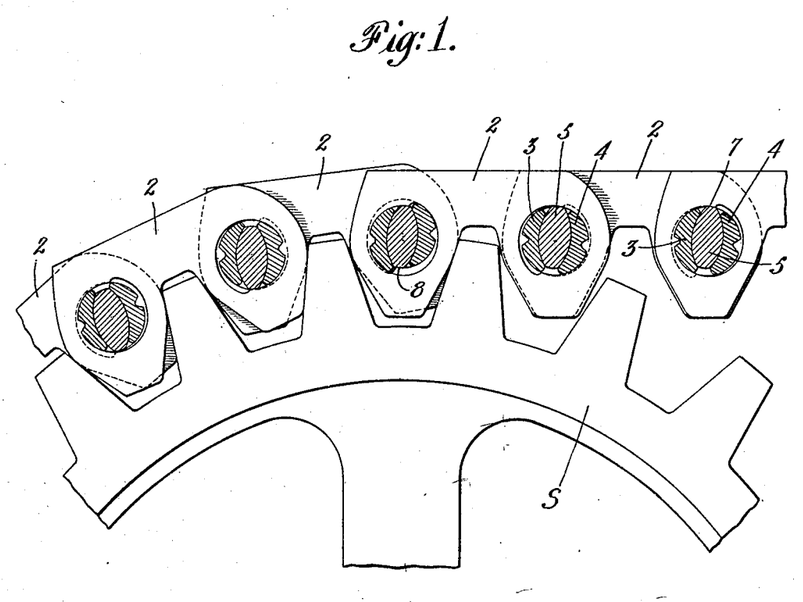
Fig. 1 is a side elevation of a portion of a chain with the joints shown in cross-section, showing the chain running on a sprocket.

Referring now to Fig. 1 of the drawings, there is shown a number of links 2, 2, etc., sufficient to illustrate the joint action as the chain bends in running on or off sprockets, the two joints on the right being straight, the center joint half bent, and the two joints on the left being fully bent as when completely seated in a sprocket. The joints are shown on a larger scale in Figs. 2 to 4 inclusive, in which Fig. 2 shows the joint when straight, Fig. 3 when half bent, and Fig. 4 when bent the full amount.

The links 2, 2, etc., are generally constructed of interspersed arch shaped link plates, which can be built up to any desired length and width in the ordinary manner of silent chains. In the drawings the usual end washers are removed and the pintle parts or joints are shown in cross-section so as to better illustrate their action. The three parts of the joint are indicated by the reference numerals 3, 4 and 5. The part 3 has a concave bearing face, and has its back secured or keyed to one set of link plates; the part 4 is secured or keyed to the adjacent set of link plates and has a concave bearing face facing the part 3. The third pintle part or floater 5 is not rigidly secured to either set of link plates, and is of double convex form fitting between the two concave bearing faces of the parts 3 and 4; the action of the floater 5, however, is controlled by the holes in the link plates in a manner to be described.

In such a three-part joint various motions are possible; for example, the two parts 3 and 4 may both move relative to the floater 5 or vice versa; the floater 5 may stay with the part 3, and both 3 and 5 turn or slide as a unit relative to the part 4; or 4 and 5 may be locked as a unit and the part 3 move relative to them. Various motions can thus be created within the joint, when, as by the present invention, the action of these parts can be regulated and controlled. It is desired to take forces created by the bending of the chain and apply them to the pintle parts so as to modify or direct their action to give the proper motion to the chain. To do this we may either use forces operating within or between the pintle parts themselves, or between the pintle parts and the walls of the pintle holes of the adjacent links which move relative thereto; or cams or control elements external of the pintle holes but operating through the links; and any combinations of these parts. We will first take up an example in which the sides of the pintle holes are used as controlling faces as in Figs. 1, 2, 3 and 4, and see how it can be made to give a double compensating action.

It will be understood that complete compensation requires a double action. When an ordinary chain runs on a sprocket, the first action of a sprocket tooth is to lift the line of pull of the chain slightly during a movement of the tooth corresponding to half the pitch, and then to drop the chain slightly during the next half of the pitch movement,—in other words, an ordinary chain runs on a sprocket wheel as though the wheel were a many-sided polygon, being continually lifted up and down. This action has been known and attempts have been made to compensate it. But the so-called compensating joints heretofore have shifted their center of articulation only in one direction during the movement of one pitch or tooth, so that they did not compensate for both the outward and inward motion that occurs. By "double compensating action" I mean that the joint is arranged so that it can compensate in one direction for part of the bend of the chain, and in another direction during the rest of the bend of the chain, so as to give a compensating effect throughout the whole engagement.

Referring now to Figs. 1 and 2, it will be noted that when the chain is straight, the floater 5 is in contact at the point 7 with the upper side of the pintle hole of the link plate to which the part 3 is keyed. The floater is designed so that it will naturally seek this upper position under tension of the chain in the straight position, the centers of the bearing faces being tilted below the line of pull a suitable amount, preferably about half the angle of bend of the chain, so that under tension when straight there is an unbalanced upward component to hold the floater 5 against the upper side 7.

When the chain begins to bend, the joint turns or slides in general in the concave surface of the part 4, the parts 3 and 5 moving as a unit owing to the fact that the upper part of the floater 5 is in contact at 7 with the link plate holding the part 3. Since the center of curvature of the bearing face of the part 4 is ahead or forward of the joint, the parts 3 and 5, together with the free or straight part of the chain attached thereto, moves downward relative to the pintle hole of the link plate which is keyed to the part 4—which is the link plate that has been engaged by the sprocket tooth and is in the process of turning on the arc of the wheel. Thus, while the part 4 has been picked up by the sprocket tooth and is being carried upward and around the sprocket, the free part of the chain attached to the parts 3 and 5 is moving downward relative to the part 4 in a compensating direction, so that the end of the chain is carried substantially straight forward without vertical motion, or at least the vertical motion is very greatly reduced. This action will be clearly understood by comparing Figs. 2 and 3.

When the tooth has traveled half a pitch forward, the part 4 which has been fixed thereto will have reached the highest point in its rotation, and from then on will tend to sink around the back of the sprocket, which would tend to carry the free end of the chain downward rather than upward. Therefore, the compensating action should be reversed and should be upward in order that the free part of the chain may continue to be carried substantially straight forward during the latter part of the engaging action. This is accomplished in the following manner.

When the bending action is about half way completed as shown in Fig. 3, the clearances are arranged so that the floater 5 will strike at the point 8 on the lower side of the pintle hole in the link plate to which the part 4 is keyed, thus stopping the motion on the concave face of the part 4. The parts 4 and 5 thus become for the time being a unit, and any further bending has to occur on the concave bearing face of the part 3. This occurs by the parts 4 and 5 as a unit turning within that face, or, in other words, by the part 3 moving upward relative to the parts 4 and 5, this being permitted by the clearance 10 which is below the parts 4 and 5,—the clearance being in the link plate carrying the part 3. The pintle hole of the link plate to which the part 3 is keyed is generally arranged to have a slight clearance over the top of and around the part 4, to permit this free movement. However, the part 4 may strike the hole at 9 if desired, instead of at all times having the clearance mentioned, and thus serve to stop the downward movement of the part 5 in a somewhat less abrupt manner than if it merely was stopped by striking at the point 8 mentioned. As the upward movement of the part 3 continues, the lower clearance 10 of its link plate is gradually diminished, so that when the bend is completed the parts are in some such position as shown in Fig. 4.

Since this latter part of the motion has carried the end of the free chain upward relative to the part 4 which is on the sprocket tooth, it will be seen that it has been in a direction to compensate the downward portion of the engaging action, so that the free chain is carried substantially straight forward throughout the entire engaging action, and the next tooth can pick up the chain just as the preceding one did, with little or no vertical vibration.

While I have shown a floater controlled in the second part as well as the first part of its action, it will be understood that it may also be left free or self controlled in the second part if desired, with turning occurring on one or both faces.

In the design of such joints, either partially or fully controlled, the degree of curvature and location of the centers may be varied, the parts tilted or inclined to each other at various and different angles, and the clearances and time of reversal in the action may be changed to various degrees to take up or offset time lag in the action, and, of course, the form and manner of keying the parts will vary in different installations; but the principles of operation will be apparent from the foregoing.

Instead of using the sides of the pintle holes as camming or controlling surfaces to produce the desired effect, the same may be produced by any other controlling or limiting surfaces which operate to shift the joint in the proper manner, while the bending action between the links is in progress, and these surfaces may be within or between the pintle members themselves, or use the side walls as described, or may be between the link plates external to the joint in the form of cams, tongues or guides; and any combinations of these various devices may also be used.

Figures 5, 6, 7:
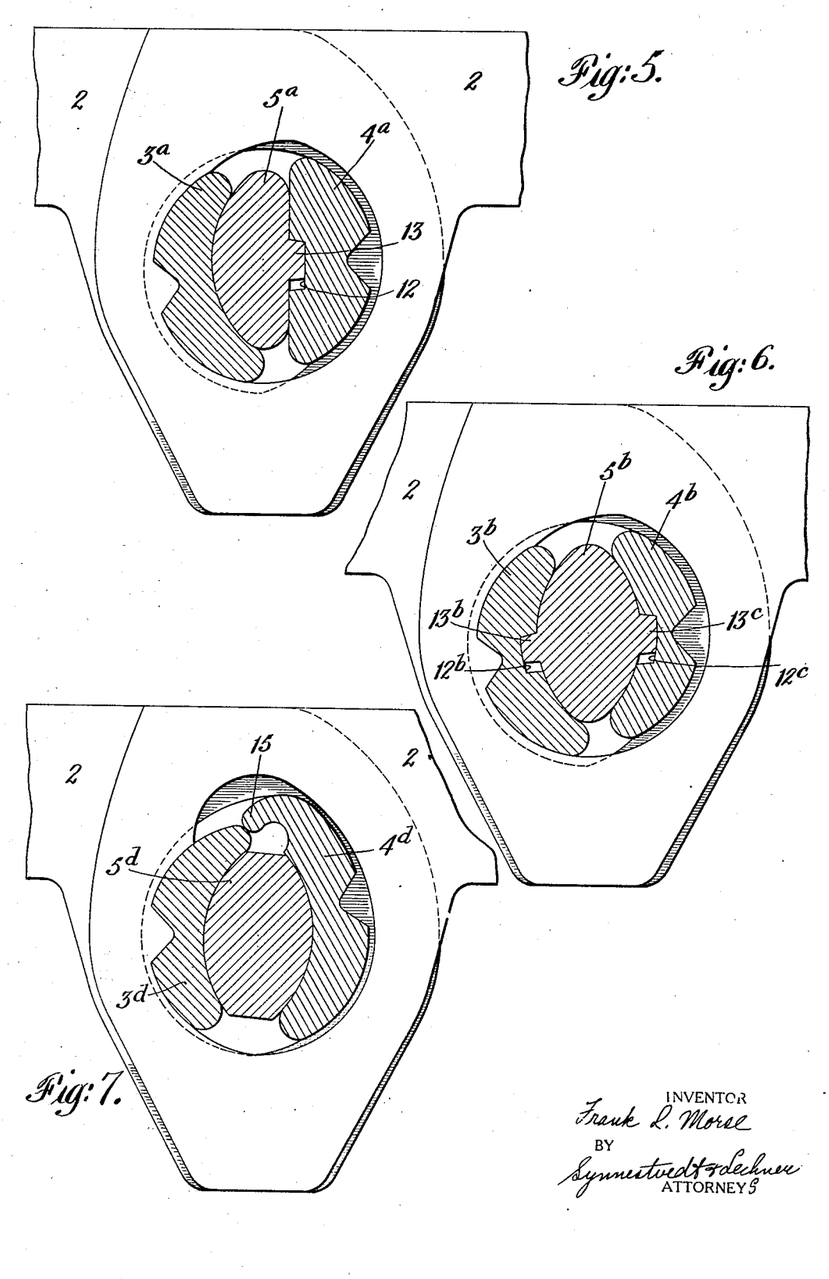
Figs. 5 and 6 are modifications in which the controlling or limiting faces are located within the pintle members themselves.
Fig. 7 is another modification in which the side bushings attached to adjoining links cam upon each other.

For example, in Fig. 5, a three part joint is shown with the part 4$^a$ provided with a slot 12 and the floater 5$^a$ provided with a tongue 13—the slot 12 being somewhat wider than the tongue 13 to permit vertical transverse movement between the parts 4$^a$ and 5$^a$ during part of the bend of the chain, but thereafter limiting it so as to compel the part 3$^a$ to turn on the opposite face of the floater 5$^a$ during the remainder of the bending action.

In Fig. 5 the face of the part 4ª is made straight instead of curved, in which case the floater 5ª will slip downward as soon as the part 4ª has turned forward past the angle of friction, and the face of the part 4ª, as well as the other face, may be initially tilted in various amounts. Fig. 6 shows another internally controlled pintle action, the floater 5ᵇ in this case having double convex faces with tongues 13ᵇ and 13ᶜ on each face, and wider grooves 12ᵇ and 12ᶜ in the parts 3ᵇ and 4ᵇ respectively. It will be obvious that the same action can be obtained if the tongue and groove are interchanged, that is, the groove may be in the floater and the tongue project from the side parts 3ᵇ or 4ᵇ. Similar tongue and groove internal controls may be used where the floaters are double concave instead of double convex, as will be described, or with a concave and straight floater, in fact any form of joint in which the internal parts have motion relative to each other, as will be obvious to those skilled in the art.

In the modification shown in Fig. 7, the floater 5ᵈ is not directly cammed, but the motion of the joint is controlled by the outside parts 3ᵈ and 4ᵈ camming on each other as the joint bends. This is a modification somewhat analogous to the external cam which will be described in connection with Fig. 10, inasmuch as the parts 3ᵈ and 4ᵈ are keyed to their respective link plates and so act as cams directly between the plates as in Fig. 10. However, in Fig. 7 the camming parts lie within the pintle holes, and so in this respect are analogous to the previously described types. The operation will be obvious from the foregoing, it being noted that when the joint bends the cam surface 15 on the part 4ᵈ first depresses the parts 3ᵈ and 5ᵈ, and then when the part 5ᵈ stops, the part 3ᵈ is permitted to return. The parts 3ᵈ and 4ᵈ may be cammed on each other in various other ways, above and below, but whenever this is done, the floater or part 5ᵈ should be left free so that it may accommodate itself on one face or the other or both to whatever motions are impressed on the joint by the cam action.

In the modification shown in Fig. 8, the controlling cam is mounted outside of the pintle holes and controls the joint by directly controlling the link plates between which it acts. It may be made in various forms of slots, pins and grooves, etc., which may be given various configurations according to whatever motion is desired, and in the form illustrated consists of a cam groove or slot 16 in the link plate that is keyed to the part 4ᵉ, and a follower pin 17 secured to the link plates that are keyed to the part 3ᵉ. The joint is shown on a larger scale in Figs. 9 and 10, in which Fig. 9 shows the position when the chain is straight and Fig. 10 when bent. The joint slides on the straight face of the part 4ᵉ and turns in the round face of the part 3ᵉ, and its action is determined by the shape of the cam 16, so that any desired motion may be given. While a straight face and a concave face are shown for purposes of illustration, it will be obvious that any joint action having a vertical shifting travel may be used with a proper cam control to give the desired action, and that the faces may be straight, convex or concave, or any combination of them, such as straight and convex, double convex, double concave, concavo-convex, etc.

While I have in the foregoing shown the application of the invention to joints composed of three or more parts, it is also applicable to ordinary two part joints, either of the bushed or single pin type, provided that the joint has sufficient vertical play so that a camming or controlled action can be impressed on it. A form of pin or bush joint controlled by a cam at the top is shown in Fig. 11, in which the cam surface 16ᶠ in the link plate 2ᶠ, which is in contact with the sprocket tooth, is arranged to first depress the bushing 18 carrying the free end of the chain and then to elevate it if desired, the cam surface acting against the follower pin 17ᶠ which is part of the link plate 2ᵍ. It is not necessary that the cam be located just as shown in the illustration, or that it have that particular configuration. It may be located on various sides, and may be larger or smaller, and the slot or cam face may open to the outside of the link plate, or into the pintle hole, and also may be formed as a part thereof. Also, as will be obvious from the foregoing, the cam or controlling surface may operate directly on the bushing or on the pintle part; or the hole itself in the link plate may be used as the controlling surface, by being arranged to meet the pintle part or bushing when the joint is partially bent, so as to interrupt the transverse motion before the bend is wholly completed. These and various other modifications will be apparent to those skilled in the art from the foregoing description of the fundamental principles, provided it is borne in mind that there is available to create the motion the relative movement of the parts which occurs when the chain bends, and that the mechanical action of the cam or controlling surface is based on controlling or moving the free or straight link relative to the link plates which have seated on the sprocket tooth and have become relatively fixed thereto.

Figures 12, 13, 14:
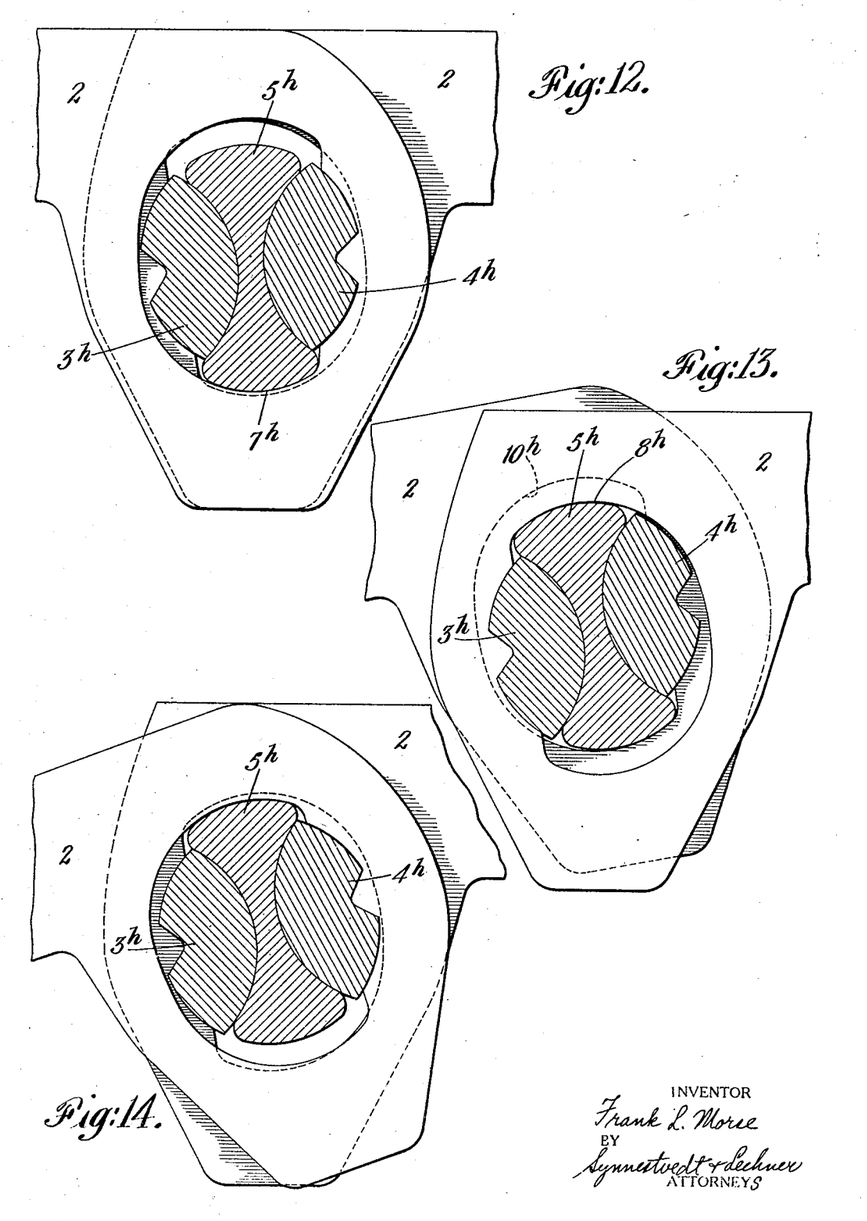
Figs. 12, 13 and 14 correspond in a general way to Figs. 2, 3 and 4, but show a double concave floater instead of a double convex floater.

In the modification shown in Figs. 12, 13 and 14, a multiple part joint is shown which, in its general operation, is somewhat similar to Figs. 1, 2, 3 and 4. But whereas in those figures the floater or intermediate pintle part 5 was double convex in cross-section, and preferably first turned on the rear face and then on the front face, the modification shown in Figs. 12, 13 and 14 has an intermediate pintle member 5ʰ which is double concave in cross-section and the controlling faces of the pintle holes are preferably arranged so that the first motion is on its front face and the next motion is on its rear face during the engaging action.

Figs. 12, 13 and 14 show the position of the joint when the chain is straight, when it is partly bent, and when it is fully bent, respectively. Referring now to Fig. 12, it will be noted that when the chain is straight, the floater $5^h$ is in contact at the point $7^h$ with the side of the pintle hole of the link plate to which the part $4^h$ is keyed. The floater is designed so that it will seek this position under the tension of the chain when in the straight position, the centers of the bearing faces being off the line of pull sufficiently to create an unbalanced component to hold the floater. When the chain begins to bend and the joint begins to move toward the position shown in Fig. 13, the joint turns or slides in general on the concave forward face of the floater $5^h$, the convex face of the part $3^h$ turning within it, while the parts $4^h$ and $5^h$ remain together as a unit owing to the fact that the lower part of the floater is in contact at $7^h$ with the link plate holding the part $4^h$.

Since the center of curvature of the part $3^h$ is ahead or forward of the joint, the part $3^h$ carrying the free or straight part of the chain moves downward relative to the pintle hole of the link plate which is in contact with the sprocket tooth, and thus moves against the lifting of the engaged tooth in a compensating direction, so that the chain is carried substantially straight forward without vertical motion, or at least the vertical motion is very greatly reduced.

When the tooth has traveled half a pitch forward, or substantially that amount, the parts will have reached the position shown in Fig. 13, and the clearances are arranged so that the floater $5^h$ will strike at the point $8^h$ on the upper side of the pintle hole in the link plate to which the part $3^h$ is keyed, thus stopping the motion on the convex face of the part $3^h$. The parts $3^h$ and $5^h$ then become, for the time being, a unit, and any further bending has to occur on the convex face of the part $4^h$, which then turns within the rearward concave face of the floater $5^h$ as it rides upward thereon. This is permitted by the clearance $10^h$ which is above the floater $5^h$ in the link connected to the part $4^h$. As the upward movement of the part $3^h$ and chain continue, the floater moving therewith on the surface of the part $4^h$ finally reaches the position shown in Fig. 14, with the floater $5^h$ above the part $4^h$, or in other words, the part $4^h$ has travelled downward relative to the floater $5^h$. It will be seen that this has given a double compensating action, since the first compensating motion was downward and the later compensating motion was upward. In the design of such joints the degree of curvature and location of the centers may be varied, the parts tilted or inclined to each other at various angles and different positions, and the clearances and time of reversal in the action may be changed to various degrees to take into account time lag in the action, and the shape of the various parts and manner of keying may also vary in different installations, as was the case with the double convex floater joint first described.

I have in the foregoing described the invention in various and preferred forms in order to make clear the principle thereof, but it will be understood that these are merely by way of illustration, and that the invention is susceptible to various modifications and adaptations as will be apparent to those skilled in the art without departing from the scope of the invention as defined in the following claims.

I claim:—

1. In a power transmission chain adapted to run on a toothed sprocket, the combination of successive articulated links, and means for introducing a double compensating action in successively opposite directions during the process of bending the chain in running on the sprocket, whereby the polygonal action of the toothed sprocket is reduced.

2. In a power transmission device, the combination of a toothed sprocket, a chain composed of links adapted to run on said sprocket, and joints connecting said links, said joints being capable of a shifting motion transverse to the line of pull, first in one direction and then in another direction, as the chain engages the sprocket, whereby the polygonal action of the sprocket is reduced.

3. In a power transmission chain, a pair of link plates, a multi-part joint connecting said plates, the joint coacting with said plates to give transverse motions about different centers at different stages in the joint action.

4. In a power transmission system, the combination with a toothed sprocket, of a chain comprising successive links, joints connecting the links, the center of articulation of said joints lying forward of the joint during the first portion of its action when engaging the sprocket, and lying rearward of the joint during the latter portion of the engaging action, whereby the polygonal action of the sprocket in engaging the chain is reduced.

5. In a power transmission system, the combination with a toothed sprocket, of a chain comprising successive links, joints connecting the links and arranged to shift transversely to the line of pull, the shifting action occurring in a direction toward the sprocket during the first portion of the motion when a link is engaging the sprocket, and occurring in a direction away from the sprocket during the latter portion of the engaging motion, whereby the polygonal action of the sprocket is reduced.

6. In a power transmission chain, the combination of a link having a pintle hole therein, a second link having a pintle hole of different configuration than the first mentioned pintle hole to permit movement of one link relative to the other in a direction transverse the line of pull, and pintle parts passing through said holes to connect the links, and arranged to form a joint permitting one link to turn relative to the other through a full pitch angle, the transverse motion being limited when the link has turned only a portion of the full pitch angle.

7. In a power transmission chain, the combination of a link having a pintle hole therein, a second link having a pintle hole of different configuration than the first mentioned pintle hole to permit movement of one link relative to the other in a direction transverse the line of pull, and pintle parts passing through said holes to connect the links, and arranged to form a joint permitting one link to turn relative to the other through a full pitch angle, the transverse motion being limited by a pintle hole when the link has turned only a portion of the full pitch angle.

8. In a power transmission chain adapted to run on a toothed sprocket, the combination of successive sets of links, and joints connecting said links, the joints and links being arranged to have a compensating action in a direction inward toward the sprocket in the first portion of the action in engaging a tooth, and a compensating action in a direction outward from the sprocket in a later portion of the engaging action, whereby the polygonal effect of the sprocket is reduced.

9. In a power transmission system comprising a chain and a toothed sprocket, the method of reducing the polygonal action of the sprocket which consists in shifting the chain inward toward the sprocket in the first portion of its engaging action and then outward from the sprocket in the later portion of its engaging action, whereby the chain may enter the sprocket by continuously moving on substantially the same straight line.

10. In a power transmission chain, the combination of a link having a pintle hole, a second link having a pintle hole, and a joint in said pintle holes connecting the links, said joint being capable of action about a center forward of the joint and a center rearward of the joint, and means for changing the action from one center to the other.

11. In a power transmission chain, the combination of successive link plates connected by joints, each joint being composed of parts capable of shifting the links relative to each other transversely to the line of pull, and means for directing said transverse shifting in directions different from those which tend to be impelled by the tension forces between the links.

12. In a power transmission chain, the combination of successive links, a joint connecting said links, said joint comprising a pintle part having a bearing face whose center of curvature is located forward of said joint and a second bearing face whose center of curvature is located rearward of said joint, and means for controlling the joint so it will turn on one of said bearing faces before the other.

13. In a power transmission chain, the combination of a link having a pintle hole, a second link having a pintle hole, pintle members extending through said holes to form a joint connecting said links, said joint permitting shifting of said links transversely to the line of pull and being limited in its action by contact with a pintle hole before its action is fully completed.

14. In a power transmission chain, the combination of a link having a pintle hole, a second link having a pintle hole, a pintle part attached to the first link and having a bearing face, a second pintle part attached to the second link and having a bearing face, and a third pintle part having bearing faces cooperating with the first and second mentioned bearing faces, the action of the third pintle part being limited so as to compel the shifting of the action from one face to the other during the operation of the joint.

15. In a power transmission chain, the combination of a link having a pintle hole, a second link having a pintle hole, a pintle part attached to the first link and having a bearing face, a second pintle part attached to the second link and having a bearing face, and a third pintle part having bearing faces cooperating with the first and second mentioned bearing faces, the relative motion between one or the other pair of bearing faces being constrained during the action so as to transfer the center of articulation from one side to the other of the third pintle part.

16. In a power transmission chain, the combination of a link having a pintle hole, a second link having a pintle hole, pintle parts extending through said holes to form a joint connecting the links, a portion of said joint being adapted to shift the first link in one direction relative to the second, another portion of said joint being adapted to shift the first link in a different direction than the first mentioned shifting motion, the action of the joint being first dominated by one of said portions and then by the other, whereby transverse shifting movements between the links may be obtained in different directions during one complete action of the joint.

17. In a power transmission chain, the combination of a link having a pintle hole, a second link having a pintle hole, pintle parts extending through said holes to form a joint connecting the links, said joint having a concavo-convex bearing surface facing forward and a concave-convex bearing surface facing backward, the action of each of the bearing faces being limited to less than the total angular movement between the links.

18. In a power transmission chain, the combination of a link having a pintle hole, a second link having a pintle hole, pintle parts extending through said holes to form a joint connecting the links, said joint having a concavo-convex bearing surface facing forward and a concavo-convex bearing surface facing backward, the action of one of the bearing faces being stopped before the links have completed their total angular movement relative to each other.

19. In a power transmission chain, the combination of a link having a pintle hole, a second link having a pintle hole, pintle parts extending through said holes to form a joint connecting the links, said joint having a concavo-convex bearing surface facing forward and a concave-convex bearing surface facing backward, the action of the two bearing surfaces being limited at different points so that they may come into action successively as one link moves through its angular movement relative to the other.

20. In a power chain drive, the combination of a sprocket having teeth, a chain composed of links adapted to engage with said teeth prior to the point of tangency of the line of pull to the pitch line, joints connecting said links and arranged to permit motion transverse to the line of pull of the free portion of the chain relative to the link in the process of engaging the sprocket, and means for directing said relative transverse motion in a direction in general toward the sprocket in the early stages of engaging and in a direction in general opposite during the later stages of engagement.

21. In a power transmission chain, the combination of a pintle part having two curved bearing surfaces whose centers of curvature lie outside of said pintle part, a chain link having a bearing surface cooperating with one of said curved surfaces, a second chain link having a bearing surface cooperating with the other of said bearing parts, whereby said pintle part forms part of a chain joint, and means for causing said joint to move on one of said curved bearing surfaces before the other.

22. In a power transmission chain, the combination of a pintle part having two curved bearing surfaces whose centers of curvature lie outside of said pintle part, a chain link having a bearing surface cooperating with one of said curved surfaces, a second chain link having a bearing surface cooperating with the other of said bearing parts, whereby said pintle part forms part of a chain joint, and camming means for causing said joint to move first on one of said curved bearing faces and then on the other.

23. In a power transmission chain, the combination of links, joints connecting said links and adapted to shift them transversely to the line of pull, and camming means for shifting them transversely first in one direction and then in another in directions tending to minimize transverse disturbances of the chain while permitting the chain to bend.

24. In a power transmission chain of the friction joint type adapted to run in a sprocket, the combination of links, joints connecting said links and adapted for transverse motion across the line of pull, and means for controlling said transverse motion in amount and direction during the action of the chain in engaging a sprocket.

25. In a power transmission chain of the friction joint type, a joint having two pairs of concave-convex bearing surfaces, links connected by said joint, and means operated by the angular movement of one link relative to another for directing the action of one of said bearing surfaces prior to the other in the operation of bending the chain.

26. A chain drive including a sprocket, a chain comprising a plurality of jointed links, and means positively operating on the link joints to prevent the chain during initial engagement with the sprocket from accelerating over the normal speed of the chain.

27. In a chain drive, a sprocket, a chain of the multiplate jointed type and positively acting means for causing the chain to travel onto the sprocket without lift in the initial stages of engagement.

28. In a chain drive, the combination of a sprocket, a multiplate chain having joints between sets of links, the axis of articulation of which is movable in a direction transverse the run of the chain, and means for shifting the axis of articulation of the joints so that the chain during its initial engagement with the sprocket travels in a line coinciding with the line of pull of the chain.

29. An oscillating joint for chains, comprising two parts or links adapted to be hinged together, and each provided with a concave bearing surface, and an intermediate pintle member having convex bearing surfaces, and arranged to slide bodily in the concave surfaces as the joint bends.

30. An oscillating joint for chains comprising two parts or links adapted to be hinged together, and an intermediate pintle member having an arcuate bearing surface whose center of curvature is displaced so as to lie on the opposite side of the structural center of the pintle from the said bearing surface.

31. An oscillating joint for chains comprising two parts or links adapted to be hinged together, each provided with a bearing surface, and an intermediate pintle member having a convex bearing surface arranged to slide in a direction crossing the line of pull of the chain.

32. An oscillating joint for chains comprising adjacent link members each carrying a concave bearing surface, and a floating pintle member having double convex bearing surfaces arranged for sliding frictional contact with the concave bearing surfaces.

33. An oscillating joint for chains comprising adjacent link members each carrying a concave bearing surface, the axis of one of said bearing surfaces being tilted relative to the line of pull of the chain, and a floating pintle member having double convex bearing surfaces arranged for sliding frictional contact with the concave bearing surfaces.

34. An oscillating joint for chains comprising adjacent link members each carrying a concave bearing surface, the axes of said bearing surfaces being tilted relative to the line of pull of the chain, and a floating pintle member having double convex bearing surfaces arranged for sliding frictional contact with the concave bearing surfaces.

35. An oscillating joint for chains comprising adjacent link members each carrying a concave bearing surface, the axes of said bearing surfaces being tilted at different angles relative to the line of pull of the chain, and a floating pintle member having double convex bearing surfaces arranged for sliding frictional contact with the concave bearing surfaces.

36. An oscillating joint for chains comprising adjacent link members each carrying a concave bearing surface, and a floating pintle member having double convex bearing surfaces arranged for sliding frictional contact with the concave bearing surfaces, the centers of curvature of the convex bearing surfaces each lying on the same side of the structural center of the floating pintle member as the convex surfaces themselves.

In testimony whereof I have hereunto signed my name.

FRANK L. MORSE.